(12) United States Patent
Sun et al.

(10) Patent No.: US 8,307,142 B2
(45) Date of Patent: Nov. 6, 2012

(54) CARD READER WITH USB INTERFACE

(75) Inventors: Zheng-Heng Sun, Taipei Hsien (TW); An-Gang Liang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 200 days.

(21) Appl. No.: 12/794,800

(22) Filed: Jun. 7, 2010

(65) Prior Publication Data

US 2011/0264838 A1    Oct. 27, 2011

(30) Foreign Application Priority Data

Apr. 22, 2010 (CN) .......................... 2010 1 0152620

(51) Int. Cl.
*G06F 13/00* (2006.01)
(52) U.S. Cl. .................. 710/301; 710/300; 710/313
(58) Field of Classification Search .......... 710/300–309, 710/313–317, 104–110
See application file for complete search history.

(56) References Cited

U.S. PATENT DOCUMENTS

| | | | |
|---|---|---|---|
| 6,205,502 B1* | 3/2001 | Endo et al. ................... 710/100 |
| 6,256,682 B1* | 7/2001 | Gudan et al. ................... 710/14 |
| 6,625,738 B1* | 9/2003 | Shiga ........................... 713/310 |
| 6,671,814 B1* | 12/2003 | Kubo et al. ................... 713/324 |
| 6,944,701 B2* | 9/2005 | Yu et al. ........................ 710/300 |
| 6,963,984 B2* | 11/2005 | Shiga ........................... 713/310 |
| 7,631,200 B2* | 12/2009 | Niwa et al. ................... 713/300 |
| 7,802,043 B2* | 9/2010 | Hauck et al. ................. 710/304 |
| 8,135,892 B2* | 3/2012 | Moosavi ....................... 710/106 |
| 2001/0009027 A1* | 7/2001 | Shiga ........................... 713/300 |
| 2003/0172312 A1* | 9/2003 | Takahashi et al. ........... 713/300 |
| 2007/0023499 A1* | 2/2007 | Wurzburg et al. ........... 235/376 |
| 2007/0028127 A1* | 2/2007 | Kim .............................. 713/310 |
| 2008/0082842 A1* | 4/2008 | Minami ........................ 713/300 |
| 2008/0288707 A1* | 11/2008 | Nicolet ......................... 710/310 |
| 2009/0055562 A1* | 2/2009 | Ito ................................ 710/105 |
| 2011/0016334 A1* | 1/2011 | Tom et al. .................... 713/300 |
| 2011/0113174 A1* | 5/2011 | Fang et al. ................... 710/300 |

* cited by examiner

*Primary Examiner* — Raymond Phan
(74) *Attorney, Agent, or Firm* — Altis Law Group, Inc.

(57) ABSTRACT

A card reader includes a printed circuit board (PCB). The PCB includes a universal serial bus (USB) interface to be connected to an electronic device, a card interface to be connected to a card, a control chip, and a normally-closed switch coupled in a wire connecting a positive differential pin of the USB interface to the control chip. A length of the wire connecting the positive differential pin of the USB interface to the control chip equals to a length of a wire connecting a negative differential pin of the USB interface to the control chip. The normally-closed switch is operable to be switched on or switched off, so as to control the connection between the card and the electronic device.

5 Claims, 4 Drawing Sheets

CARD READER WITH USB INTERFACE

BACKGROUND

1. Technical Field

The present disclosure relates to a card reader.

2. Description of Related Art

Most card readers include universal serial bus (USB) interfaces. When a USB card reader is connected to an electronic device, such as a computer, a card received in the card reader communicates with the computer. When a user no longer need to read or write to the card, the user may use the operating system to "eject" the card. The card is not physically removed from the card reader but is shown as not present or ignored by the operating system. For the operating system to access the card again, the card reader must be physically disconnected and reconnected to the computer.

Moreover, the card may not be detected by the computer when the card reader is initially plugged in, so the card reader must be unplugged and replugged from the computer, maybe even for several times until the card is detected by the computer.

Having to repeatedly insert the card reader each time may wear out the USB interfaces of the computer and the card reader more quickly. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
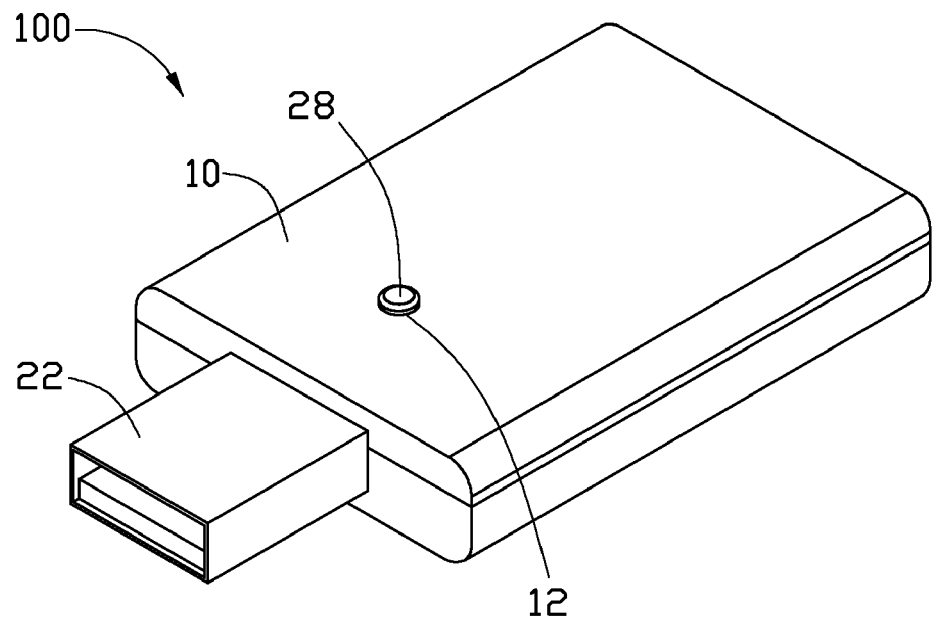
FIG. 1 is an isometric view of an exemplary embodiment of a card reader.
Figure 2:
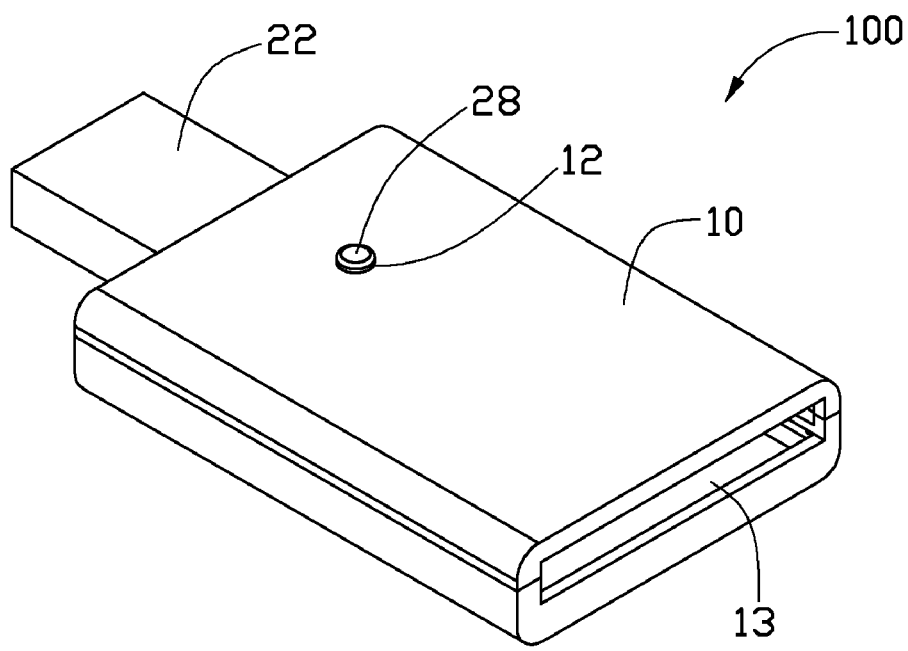
FIG. 2 is similar to FIG. 1, but viewed from another perspective.
Figure 3:
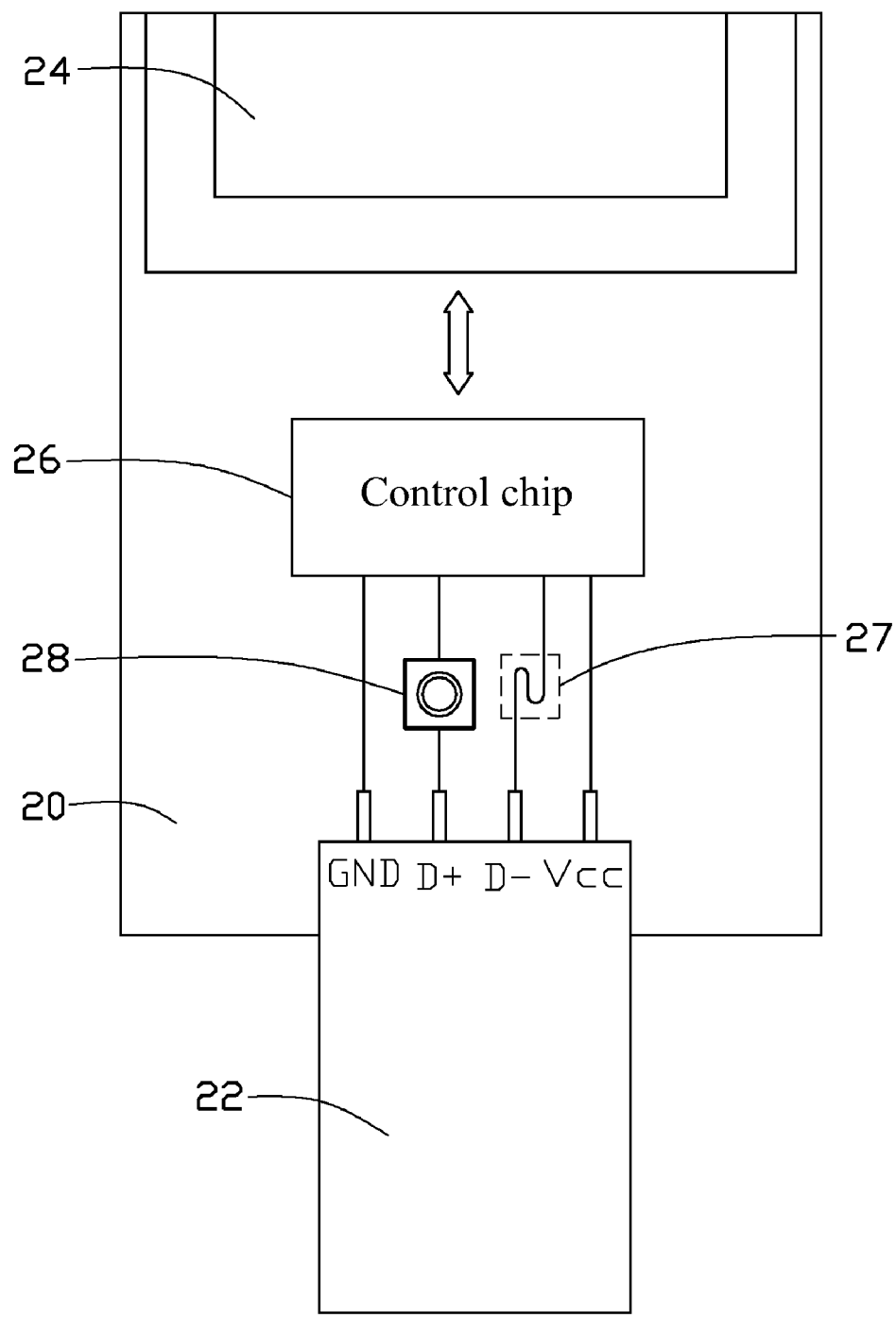
FIG. 3 is a schematic view of an exemplary embodiment of a printed circuit board (PCB) of the card reader of FIG. 2.

Referring to FIGS. 1 to 3, an exemplary embodiment of a card reader 100 includes a housing 10 and a printed circuit board (PCB) 20.

The housing 10 defines a hole 12 in a top of the housing 10, and defines a card space 13 to receive a card 30.

The PCB 20 includes a universal serial bus (USB) interface 22, a card interface 24, a control chip 26, and a normally-closed switch 28. The control chip 26 is connected between the USB interface 22 and the card interface 24. The switch 28 includes a first terminal connected to a positive differential signal pin D+ of the USB interface 22 through a first wire, and a second terminal connected to the control chip 26 though a second wire. A third wire connecting a negative differential signal pin D− of the USB interface 22 to the control chip 26 includes a backward "s" curve portion 27, to have the same length as a circuit path from the differential signal pin D+ of the USB interface 22 to the control chip 26 through the first wire, the switch 28, and the second wire, to ensure timing of signals. The switch 28 is exposed out of the housing 10 through the hole 12.

Figure 4:
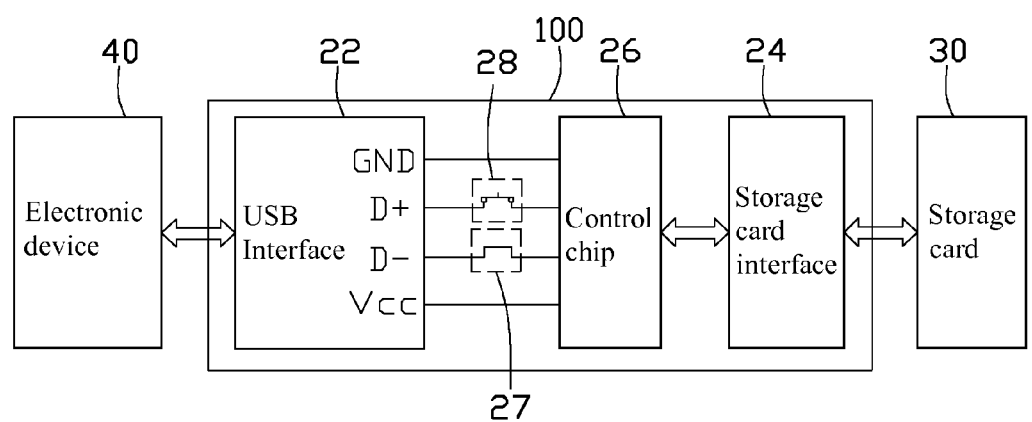
FIG. 4 is a circuit block diagram of the PCB of FIG. 3 connected to an electronic device and a card.

Referring to FIG. 4, in use, a card 30 is inserted into the card space 13, to connect to the card interface 24. The USB interface 22 is connected to a USB interface (not shown) of an electronic device 40, thereby the card 30 communicates with the electronic device 40 through the control chip 26. Once the card 30 is ejected from an operating system of the electronic device 40, the card 30 is not detected by the electronic device 40 even though the card reader 100 receiving the card 30 is still connected to the USB interface of the electronic device 40. If the card 30 needs to be accessed by the electronic device 40 again, the switch 28 is pressed for a while and then released. When the switch 28 is pressed, connection between the card 30 and the electronic device 40 is broken off. When the switch 28 is released, connection between the card 30 and the electronic device 40 is restored. The electronic device 40 can once again find the card 30.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A card reader for a card, the card reader comprising:
    a housing; and;
    a printed circuit board (PCB) received in the housing, the PCB comprising:
        a universal serial bus (USB) interface to be connected to an electronic device, the USB interface comprising a positive differential pin and a negative differential pin;
        a card interface to be connected to the card;
        a control chip; and
        a normally-closed switch comprising a first terminal connected to the positive differential pin of the USB interface through a first wire, and a second terminal connected to the control chip through a second wire;
    wherein a length of a circuit path from the positive differential pin of the USB interface to the control chip through the first wire, the normally-closed switch, and the second wire, equals to a length of a third wire connecting the negative differential pin of the USB interface to the control chip; and
    wherein the normally-closed switch is operable to be switched on or switched off, so as to control connection between the card and the electronic device.

2. The card reader of claim 1, wherein the housing defines a hole in a top of the housing, the normally-closed switch is a switch exposing out of the housing through the hole.

3. The card reader of claim 1, wherein the third wire connecting the negative differential pin of the USB interface to the control chip includes a curved portion to ensure the length of the third wire equals to the length of the circuit path.

4. A card reader comprising:
    a card interface;
    a control chip connected to the card interface;

a universal serial bus interface (USB) connected to the control chip, the USB interface comprising a positive differential pin and a negative differential pin; and a switch comprising a first terminal connected to the positive differential pin of the USB interface through a first wire, and a second terminal connected to the control chip through the second wire;

wherein a length of a circuit path from the positive differential pin of the USB interface to the control chip through the first wire, the normally-closed switch, and the second wire, equals to a length of a third wire connecting the negative differential pin of the USB interface to the control chip; and wherein the switch is configured to electrically connect and disconnect the control chip to the USB interface.

5. The card reader of claim 4, wherein the third wire connecting the negative differential pin of the USB interface to the control chip includes a curved portion to ensure the length of the third wire equals to the length of the circuit path.

* * * * *